United States Patent [19]

Watanabe et al.

[11] 4,232,341
[45] Nov. 4, 1980

[54] IMAGE DISPLAY APPARATUS

[75] Inventors: Toshiro Watanabe, Zushi; Koji Suzuki, Yokohama, both of Japan

[73] Assignee: Sony Corporation, Tokyo, Japan

[21] Appl. No.: 958,640

[22] Filed: Nov. 8, 1978

[30] Foreign Application Priority Data

Nov. 11, 1977 [JP] Japan .................. 52/135941

[51] Int. Cl.$^3$ .............. H04N 5/72; H04N 5/64
[52] U.S. Cl. ..................... 358/250; 358/254; 358/253; 312/7 TV
[58] Field of Search .............. 358/250, 251, 252, 253, 358/254, 255, 247; 312/7 TV; 350/311

[56] References Cited

U.S. PATENT DOCUMENTS

| 2,837,734 | 6/1958 | Bowie | 358/250 |
| 3,646,266 | 2/1972 | Hassell | 358/253 |
| 3,828,127 | 8/1974 | Lehmann | 358/250 |

*Primary Examiner*—John C. Martin
*Assistant Examiner*—Edward L. Coles

*Attorney, Agent, or Firm*—Lewis H. Eslinger; Alvin Sinderbrand

[57] ABSTRACT

An image display apparatus utilizes differences between the recognition or discrimination system of the human eye and the eye-movement system of the human eye to present in image which has an enhanced quality of solidness and yet does not cause eye fatigue. The image display apparatus includes an image source, such as a color cathode ray tube; a main image display screen for displaying an image of the image source without substantially reducing its resolution; a first, inner frame surrounding the main image display screen; a moderated image display screen for displaying a peripheral part of the image of the image source with reduced resolution; and a second, outer frame surrounding the moderated image display screen. In one embodiment, the moderated image display screen is formed of a lamination of a multi-layer Fresnel lens and an opal scattering plate. In another embodiment the moderated image display screen consists of a lamination of a multi-layer Fresnel lens, an opal scattering plate, and a fly-eye lens.

10 Claims, 6 Drawing Figures

IMAGE DISPLAY APPARATUS

BACKGROUND OF THE INVENTION

1. Field of the Invention

This invention relates to a novel video display apparatus and more particular to a video display apparatus which can display an image of high quality.

2. Description of the Prior Art

In a video display apparatus, such as a television receiver, a peripheral portion of a cathode ray tube is covered by a front mask. In a conventional television receiver, the front frame is used to mask a non-luminous part of the cathode ray tube only in view of the appearance of the television set and the fact that there is a textural difference between the front frame and the image displayed on the cathode ray tube is ignored. For example, a color of the front frame is selected as black or gray in a conventional television receiver, and then the hue and texture of the front frame are quite different from that of the displayed image on the cathode ray tube.

In such a conventional receiver, a viewer can not view the image with high quality for the following reasons. The human eyes have two characteristics in pattern perception: one is known as central vision and the other is known as peripheral vision. Central vision is used for recognizing meaning of a visual pattern, while peripheral vision is used for recognizing the position or movement of the pattern and thereby controls the movement of the eyes. More particularly, central vision is related to a recognition or discrimination system of the eyes, and peripheral vision is related to an eye-movement system of the eyes. Because peripheral vision controls movement of the eyes, the boundary between the front frame of the television receiver and the image on the cathode ray tube is discerned easily by peripheral vision. In watching the image on the television receiver, since peripheral vision controls the movement of the eyes, the front frame is not recognized by central vision. Thus, unless distracted, a viewer keeps his attention only on the central portion of the image, so the resolution of the peripheral portion of the image on the cathode ray tube serves no purpose to the viewer's perception of the image. Furthermore, the.

High contrast between the front frame and the displayed image on the cathode ray tube in a conventional television receiver induces fatigue of the eyes.

OBJECTS AND SUMMARY OF THE INVENTION

An object of this invention is to provide a novel image display apparatus displaying a natural image.

Another object of this invention is to provide an image display apparatus in which a viewer can watch a displayed image without fatigue.

Still another object of this invention is to provide a television receiver set which accords with the ambiance (visual environment) of the set.

According to an aspect of the present invention there is provided an image display apparatus which comprises an image source, a main image display device for displaying a main image of the image source without substantially reducing the resolution thereof, a first frame surrounding the main image display device, a moderated image display device for displaying a peripheral part of the image of the image source but with reduced resolution, and a second frame surrounding the moderated image display device. In this invention, the first frame preferably designed so that the first frame can be recognized by a recognition or discrimination system of the eyes but can not be recognized by the eye movement system of the eyes, while the second frame is designed so that the second frame can be recognized by the eye movement system of the eyes.

Other objects, features and advantages of the present invention will become apparent from the following description taken in conjunction with the accompanying drawings.

DESCRIPTION OF THE PREFERRED EMBODIMENTS

The present invention will be hereinafter described with reference to the attached drawings.

Figure 1:
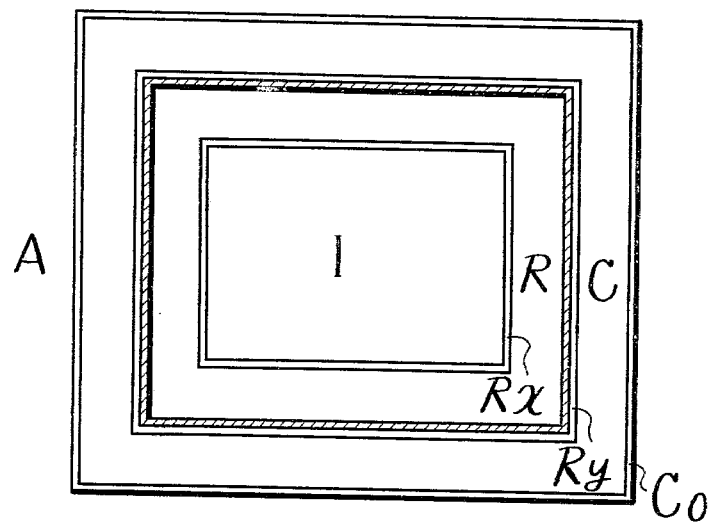
FIG. 1 is a front view showing an example of an image display apparatus according to the present invention.

Turning to FIG. 1 which shows an example of the image display apparatus according to the invention, the example includes a main image area I and a moderated image area R which surrounds the main image area I. On the boundary between the main image area I and the moderated image area R there is provided an inner frame $R_x$ having a uniform width, and along the outer periphery of the moderated image area R there is provided an outer frame $R_y$ also having a uniform width. Further provided are a decorative area C, which surrounds the moderated image area R, and an outer frame $C_o$ along the outer edge of the decorative area C which partitions the image display apparatus from an ambiance A (i.e., from that portion of the viewer's scope of view falling beyond the image display apparatus).

The main image area I will correspond to the picture screen of a color cathode ray tube, and the moderated image area R corresponds to a display area which is rather low in resolution (and, hence, tends to blur the image) and also is rather low in contrast as compared with the main image area I. On the one hand, inner frame $R_x$ can be recognized by the recognition or discrimination system of the human eye in perceiving a visual sensation, but can not be recognized so easily by the eye movement system of the human eye. On the other hand, the outer frame $R_y$ can be easily recognized by the eye-movement system. Therefore, the outer frame $R_y$ is so designed that it stimulates a strong sensation of contrast in the viewer by reason of its extreme (low or high) reflection factor. For example, as indicated by single hatches in FIG. 1, the inner periphery of the outer frame $R_y$ adjacent the moderated image area R is made to be grey-near-black which has reflection factor of about 10 to 30% and the outer periphery of the outer frame $R_y$ adjacent the decorative area C is made to be grey-near-white which has a reflection factor of about 60 to 80%.

Further, in order to assure that the main image area I and moderated image area R are sensed to have the same texture and also that the decorative area C and the ambiance A appear to have the same texture, the outer frame $R_y$ is designed to have visual uniformity at its outer and inner sides. For example, the moderated image area R can be a glass plate or similar plate which has the same texture as that of the face plate of a cathode ray tube which will be the main image area I. Further, the decorative area C is formed to have its hue and texture the same as those of the wall of the ambiance A and recognizable pieces of furniture in a room. In addition thereto, the area (I+R) inside of the outer frame $R_y$ is desired to generally favor blue colors (which are short in wavelength) while the area (C+A) outside of the outer frame $R_y$ is desired to generally favor the yellow, brown and red colors (which are long in wavelength). Otherwise, if possible, the walls, pieces of furniture, etc., having the same hue and visual texture as those of the decorative area C can be located near the apparatus.

For a viewer watching a television image on the image display apparatus according to the present invention having the construction as described above, it has been ascertained by experiments that the viewer perceives the image to have a quality of solidness, and thus a dimension of realism is added to the image. Further, this is accomplished without visual fatigue to the viewer. The foregoing advantages can be explained by the brief summary of the visual characteristics of the human eye-brian system.

The human retina includes two kinds of receptor cells cones and rods. Normally, while a viewer watches television, the output from cone cells at the center of the retina is transmitted but the output from the rod cells surrounding the cone cells is not transmitted. It is now understood that the ganglion cell, which is the output cell of the cone cell, is divided into two cells called X- and Y-cells. It is thought that the X-cell serves to recognize an object and to discriminate between objects, while the Y-cell serves to control the unconscious eye movement. That is, the Y-cell controls the gazing point of the eye intermittently and without the viewer's conscious knowledge. Indeed, the human eye can be functionally understood as two separate eyes within the same structure, each of the eyes transmitting different types of information and performing different functions. Thus, the human eye can be characterized as an X-eye dominated by the X-cell and a Y-eye dominated by the Y-cell. The X-eye and the Y-eye occupy the same space and move together. Thus, in visual sensation, the recognition or discrimination system is the X-eye and the eye-movement system is the Y-eye. The image display apparatus of the above present invention utilizes the difference in information transmitted to the brain by the two eyes. That is, on the moderated image area R there is displayed an image similar to that on the main image area I for the Y-eye so that for the Y-eye the inner frame $R_x$ is not so recognizable while the outer frame $R_y$ is recognizable. Thus, the Y-eye clearly recognizes the outer frame $R_y$ and the area (I+R+$R_x$) together inside of the former, and hence, due to the space recognition function of the Y-eye, it can be said that the main image area I can be expanded to the outer frame $R_y$. However, for the X-eye the difference between the main image area I and moderated image area R is clear and the boundary therebetween is pointed out by the inner frame $R_x$ and hence the two areas I, R are easily distinguished. Since the movement of the X-eye is dominated by the Y-eye, so long as the object of attention rests on the main image area I, the X-eye devotes itself to the recognition or discrimination function without being influenced by the outer frame $R_y$ and decorative area C. As set forth above, with the present invention the spatial sense inherent to the picture itself can be easily perceived by a viewer and his attention can naturally enter the main image area.

Further, with the invention, when an object in the picture moves across the image area and the gazing point of the eye is moved to a necessary point in the picture, the reference frame of eye movement is the outer frame $R_y$. Since the outer frame $R_y$ or reference frame is always displayed as wide and distinct as compared with the main image area I, the freedom and stability of eye movement is increased, and the area (I+R) is localized relative to the ambiance A, and hence the image is comfortably perceived.

As described above, according to the present invention, since the visual effects for both the X-eye and Y-eye are superimposed, the spatial information of the image itself is perceived sufficiently and a viewer can enjoy a sense of solidness without any eye fatigue.

Further, since in the present invention there is presented to the viewer a video display without the presence of the high-contrast front mask as in the prior art television receiver, the present invention avoids optical noise such as that directly generated in the retina by Mach's effect. As a result, the characteristic blurring of the prior-art television picture at its four peripheral portions can be avoided.

Turning back to FIG. 1, in this example, the outer frame $R_y$ is so constructed that the areas of high or low reflection factor present a visually clear contrast so the outer frame $R_y$ can be clearly recognized. In this case, the outer frame $R_y$ is of grey-near-black (reflection factor of 10 to 30%) along its inner periphery and of grey-near-white (reflection factor of 60 to 80%) along its outer periphery, and the decorative area C is of a light color with a low reflection factor on its surface. Then, because the peak values of white and black on the main image area, when a picture is presented, become more extreme than the peak values in the scattering reflection on the two areas inside of the outer frame $R_y$, the outer frame $R_y$ serves as a kind of reference for the luminosity of the main image, and it is percepted that the contrast of picture appears to be enhanced in the main image area.

In general, the light from a television picture is rich in short wavelength light (bluish tones) as compared with the light in the room and scenes are quite common in a television broadcast involving, as a subject, a person whose skin color is a main color (longer wavelength skin tones) and the color of whose surroundings is selected as a complementary color thereof (shorter wavelength colors), so that if the color of the inner area (I+R) of the outer frame $R_y$ is generally selected as a color of short wavelength while the color of the outer area (C+A) thereof is generally selected as a color of long wavelength, the present invention affords the advantage that, because the fovea centralis or the retina is especially sensitive to long wavelength light, the gazing point is not moved and hence no fatigue is caused. Furthermore, the image display apparatus is more attractive in relation to the room in which it is located.

Figure 2A:
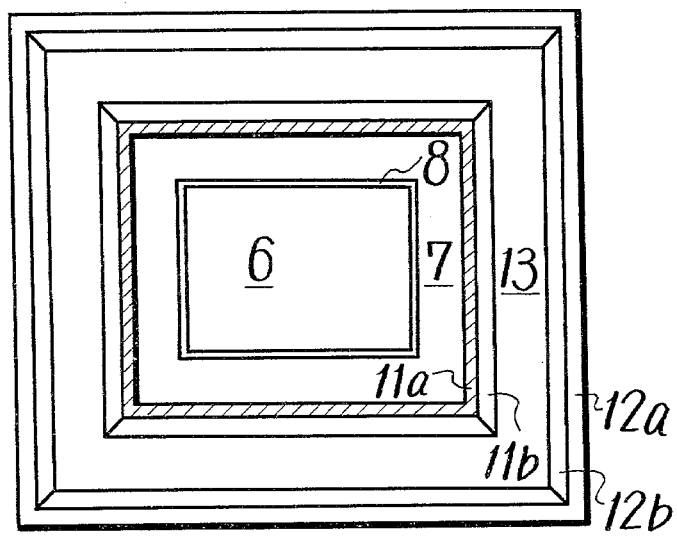
FIG. 2A is a front view of a color television receiver to which the present invention is applied.
Figure 2B:
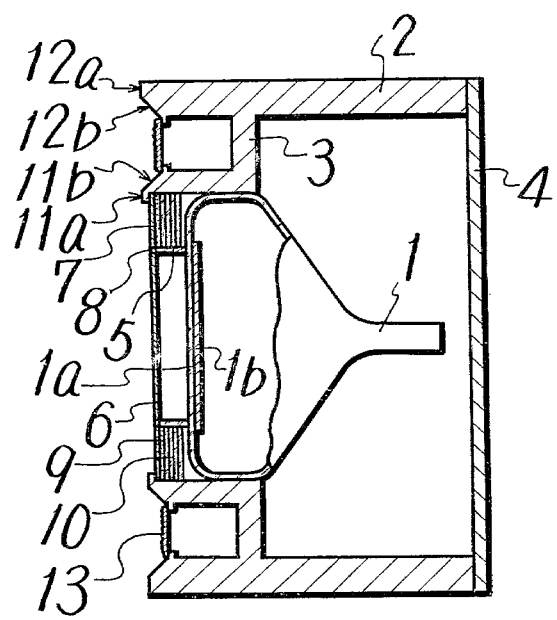
FIG. 2B is cross-sectional view of such a color television receiver.
Figure 2C:
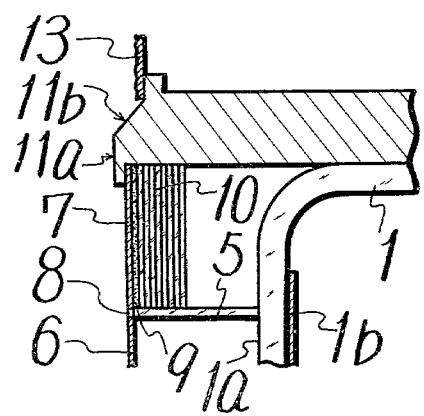
FIG. 2C is an enlarged view of a part of the receiver shown in FIG. 2B.

With reference to FIGS. 2A, 2B and 2C, an example of the invention as applied to a television receiver will now be described. In the drawings, 1 designates a color cathode ray tube which is accommodated in a case 2. The color cathode ray tube 1 comprises a face plate 1a and a phosphor screen 1b. The case 2 comprises a framing member 3 which has an inner shape coincident with the outer shape of the color cathode ray tube 1 therein and a back board 4 at the rear thereof. A transparent reflecting plate 5 is affixed to the face plate 1a at a position close to the edge thereof but inside it and perpendicular to the face plate 1a. In this embodiment, the transparent reflecting plate 5 is made of transparent material but acts as a reflecting plate because of the low incident angles of light thereon. A smoke filter 6 with rather blue color (which will be hereinafter referred to as a blue smoke filter) is provided to cover the area of the face plate 1a which is defined by the transparent reflecting plate 5. Between the transparent reflecting plate 5 and the framing member 3 there is provided another blue smoke filter 7. In this embodiment, as clearly shown in FIG. 2C in an enlarged scale, an opal scattering plate 8 is inserted between the blue smoke filters 6 and 7 or on the end surface of the transparent reflecting plate 5. Such opal is relatively narrow, such as from about one millimeter to several millimeters. The transmissivity of the blue smoke filters 6 and 7 is selected as, for example, 30%. At the rear of the blue smoke filter 7 there is located a pass-through type opal scattering plate 9 and at the rear thereof there is located a multi-layer Fresnel lens 10 which consists of seven to ten laminated Fresnel convex lenses. The transparent reflecting plate 5, pass-through type opal scattering plate 9 and multi-layer Fresnel lens 10, transmit a moderated image, whose resolution is lowered, the image being formed from the image light at the outer-most periphery of the color image.

When the image display apparatus of the invention with the above construction is viewed from the front, as shown in FIG. 2A, the blue smoke filter 6 corresponds to the main image area I, the blue smoke filter 7 corresponds to the moderated image area R and the narrow opal scattering plate 8 corresponds to the inner frame $R_x$.

Further, on the end surface of the framing member 3 viewed from the front, there are formed a flat end face 11a and an inclined end face 11b contiguous thereto, and similarly on the end surface of the outer frame of the case 2 there are formed a flat end face 12a and an inclined face 12b contiguous thereto. Between the end face of the inner frame 3 and the outer frame of the case 2 there is stretched a beige cloth or textile strip 13. The end face 11a of the framing member 3 is painted black, and its inclined end face 11b, the end face 12a of the case 2 and the inclined end face 12b thereof have a wood-grained pattern. When the case 2 itself is not made of wood, a sheet made of synthetic resin and having a wood-grained pattern is coated onto each of the above end faces 11b, 12a, 12b.

The black end face 11a and the inclined end face 11b with the wood-grained pattern have quite different reflection factors and form the outer frame $R_y$ of the moderated image area R. The beige textile strip 13 forms the decorative area C, and the end faces 12a and 12b of the outer frame of the case 2 form the outer frame $C_o$.

The color cathode ray tube 1, provided in above example of the image display apparatus according to the present invention, can be of any conventional design and is driven as in any conventional ordinary color television receiver when the reproduced picture is displayed on the face plate 1a thereof, the advantage of the invention already set forth above is afforded and the viewer perceives the picture to have a quality of solidness and naturalness.

Figure 3:
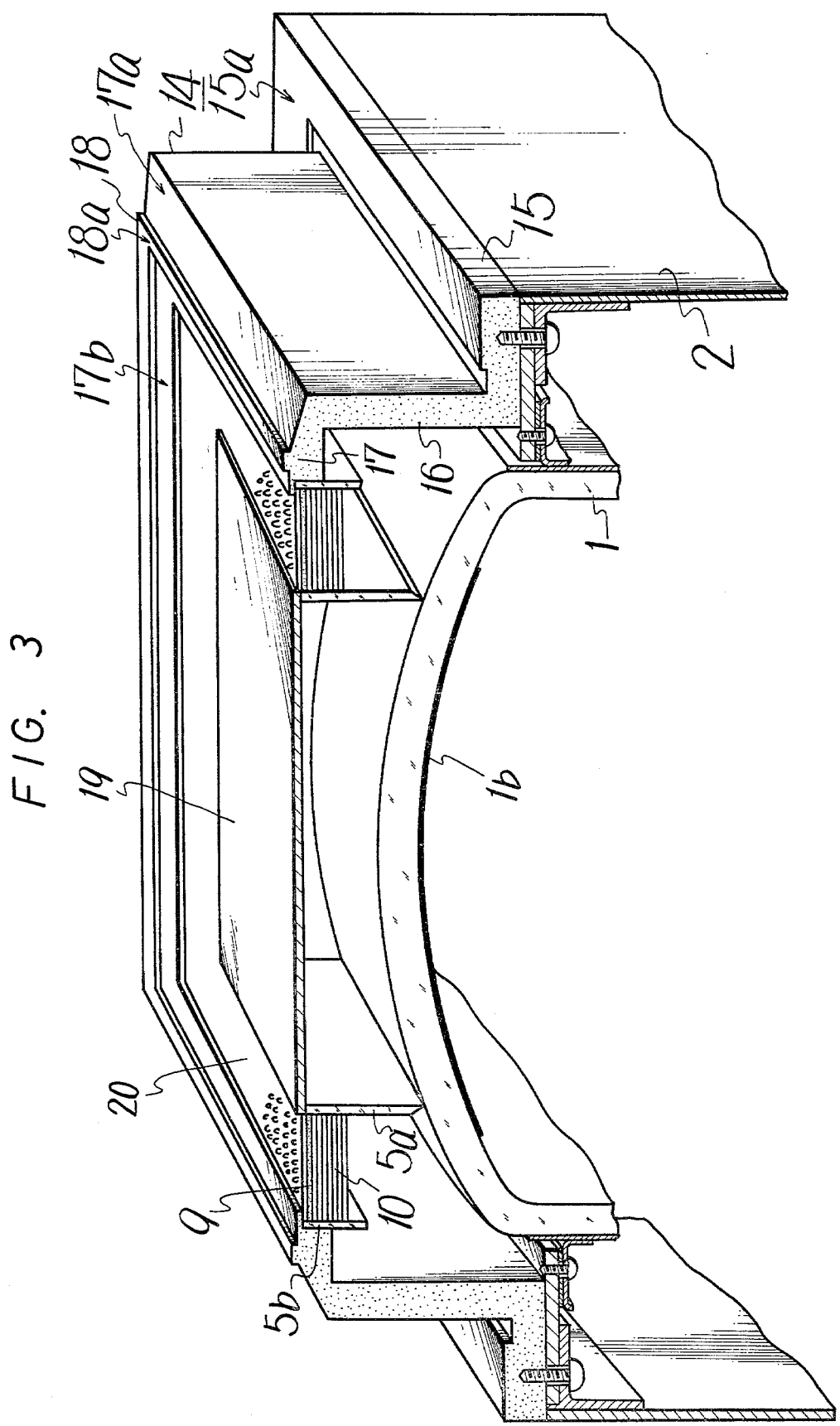
FIG. 3 is an enlarged perspective view, partially in cross-section showing, another example of the invention.

FIG. 3 is a perspective view particularly showing in cross-section, another example of the invention. In this example, the color cathode ray tube 1 is housed in the case 2 and the panel portion of the color cathode ray tube 1 is projected a short distance outside the front open end of the case 2. The end face of the case 2 is bent in an L-shaped configuration contacts the color cathode ray tube 1 near its corner. An attaching frame 14 for the optical system is fixed to the case 2 by, for example, screws. The attaching frame 14 is made of acrylic resin and has a base member 15 with a uniform width, which is fixed to the case 2 by the screws, a frame member 16 extended integrally from the base member 15 in the tube axis direction of the color cathode ray tube 1 and an edge member 17 which is made by the fact that the end face of the frame member 16 is bent in an inverse L-shape. A strip projection 18, which is formed with the edge member 17 and has the same configuration but narrower, is provided on the top surface of the edge member 17 along its center. The respective surfaces of the attaching frame 14 with the above members are painted to have the following colors. A surface 15a of the base member 15, which is positioned outer most viewed from the front, is painted beige, a surface 18a of the strip projection 18 on the edge member 17 is painted greyish white, a surface 17a of the edge member 17 outside the strip projection 18 is painted cream color, and a surface 17b of the edge member 17 inside the strip projection 18 is painted bluish black.

A transparent reflecting plate 5a is affixed within the central opening of the attaching frame 14 in the vertical direction at a position somewhat inside the outer periphery of phosphor screen 1b. A neutral density filter 19 is stretched across the free ends of the reflecting plate 5a. Another transparent reflecting plate 5b is attached to the attaching frame 14 parallel to the transparent reflecting plate 5a. Between the opposing faces of the transparent reflecting plates 5a and 5b there is provided an optical member for forming a moderated image. As this optical member, an arrangement can be used consisting of, from the back to front, a multi-layer Fresnel lens 10, a pass-through type opal scattering plate 9 and a fly-eye lens 20 of a small diameter laminated to one another.

Figure 4:
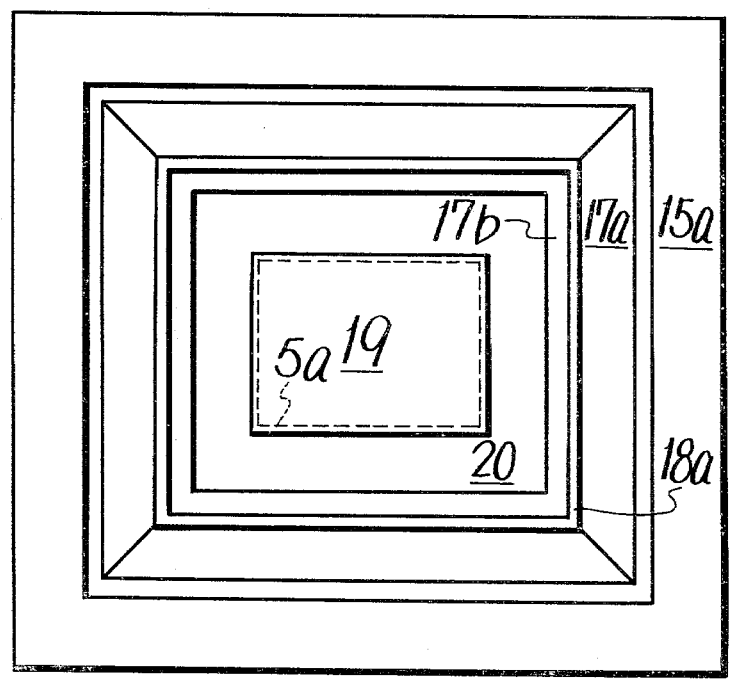
FIG. 4 is a front view of the example shown in FIG. 3.

FIG. 4 is a front view of the example shown in FIG. 3. In this example, the neutral density filter 19 corresponds to the main image area I, and the end surface of the transparent reflecting plate 5a, which is covered by the neutral density filter 19, is seen as a dark edge, when the color cathode ray tube 1 emits light, and hence becomes the inner frame $R_x$ of the moderated image area R. The area of the fly-eye lens 20 becomes the moderated image area R, and the surface 17b of the edge member 17 which has a low reflection factor and the surface 18a of the strip projection 18 which has a high reflection factor together become the outer frame $R_y$. Further, the surface 17a of the edge member 17 becomes the decorative area C, and the surface 15a of the base member 15 becomes the outer frame $C_o$, respectively.

As described above, the second example of the image display apparatus according to the present invention affords similar operation and advantages to those of the first example of the invention.

In addition to the above examples of the invention, there may be considered various modifications, for example, in which the outer frame $R_y$ of the moderated image area R is formed of strips with three colors, such as, dark blue, greyish white and yellowish dark grey.

Also, as the moderated image area, it is sufficient at a fundamental level, to use a transparent scattering plate.

Further, it will be apparent that the present invention can be applied to a film projector or the like as well as to a television receiver. The foregoing are furnished only as examples of the present invention, of which many variations are possible, and whose scope is to be measured by the appended claims.

We claim as our invention:

1. An image display apparatus comprising:
   an image source;
   main image display means for displaying a main image of said image source without a substantial reduction in resolution of said main image;
   a first frame surrounding said main image display means;
   moderated image display means for displaying a peripheral part of said image of said image source but with a reduction in resolution of said image; and
   a second frame surrounding said moderated image display means;
   wherein said first frame is designed so that a recognition or discrimination system characteristic of a viewer's eyes will recognize said first frame, but an eye-movement system characteristic of the viewer's eyes will not recognize said first frame; and wherein said second frame is designed so that said second frame is recognizable by the eye-movement system of the viewer's eyes.

2. An image display apparatus according to claim 1, wherein said second frame comprises a first edge and a second edge arranged adjacent each other, and said first edge has a higher reflection factor than said second edge.

3. An image display apparatus according to claim 2, wherein said first edge of said second frame has a reflection factor of about 10 to 30 percent and said second edge thereof has a reflection factor of about 60 to 80 percent.

4. An image display apparatus according to claim 3, wherein the average of the respective reflection factors of said first and second edges is selected to be approximately 50 percent.

5. An image display apparatus according to claim 1, further comprising an outer portion surrounding said second frame and having a low reflection factor in respect to that of said second frame.

6. An image display apparatus according to claim 5, wherein said apparatus is designed to be situated in a particular ambiance, and wherein said moderated image and said main image have similar textures, and said outer portion and said ambiance have similar textures.

7. An image display apparatus according to claim 5, wherein said main image display means and said moderated image display means are designed to give preference to relatively short wavelength visible light, while said outer portion is designed to give preference to relatively long wave-length visible light.

8. An image display apparatus according to claim 1, wherein said moderated image display means comprises transparent light scattering means.

9. An image display apparatus according to claim 8, wherein said moderated image display means further comprises lens means for transmitting light from the peripheral portion of said image source to said transparent light scattering means.

10. An image display apparatus comprising:
    a cathode ray tube having a phosphor screen on which an image is to be formed;
    main image display means for displaying said image on said screen of said cathode ray tube without substantial reduction in resolution of said image; and
    moderated image display means having light scattering means for displaying a peripheral part of said image on said screen but with a reduction in resolution of said image.

* * * * *